Patented Dec. 30, 1947

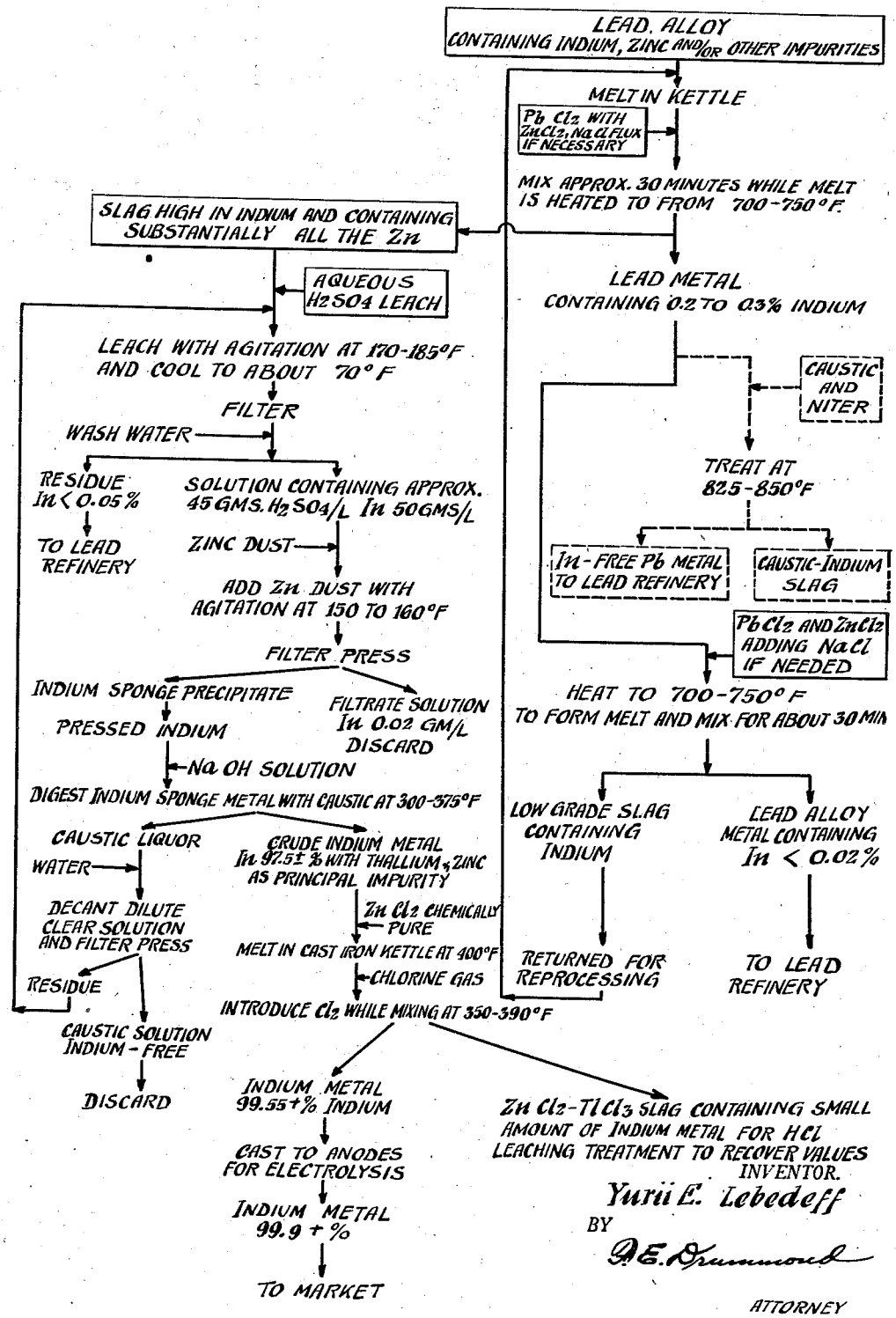

2,433,770

UNITED STATES PATENT OFFICE 2,433,770

PROCESS OF RECOVERING INDIUM

Yurii E. Lebedeff, Metuchen, N. J., assignor to American Smelting and Refining Company, New York, N. Y., a corporation of New Jersey Application March 17, 1944, Serial No. 526,978

11 Claims. (Cl. 75—84)

This invention relates to a process for recovering indium from metals or alloys such as lead, zinc and the like.

Methods have been developed heretofore for treating indium-containing metals to recover indium which comprise heating the metal with caustic soda and niter to selectively oxidize the indium whereby it can be removed and recovered. When appreciable amounts of zinc or other impurities such as Sn, As, Sb, Te, etc. are present, however, the caustic-niter fusion process is not effective in bringing about a clean-cut selective separation of indium from these impurities.

According to the present invention a method is provided for removing indium from impure metals or alloys particularly zincky lead metal containing indium by converting the indium into indium chloride. A melt of the metal containing indium is treated with a suitable chlorine supplying agent or gaseous chlorine to selectively remove the zinc and indium as chlorides using a low melting cover slag and temperatures sufficiently low to avoid loss of indium by volatilization.

The accompanying drawing illustrates by means of a flow sheet the various steps of my new process. It will be observed that the process includes reacting the melt containing indium with a chloridizing agent in the presence of a low melting flux or slag whereby substantially all of the indium is converted to indium chloride which enters the slag phase. The pyrometallurgical process is carried out without appreciable loss of indium due to volatilization by the use of a low melting chloride cover slag. After the melt has been sufficiently chloridized the slag is drawn off and treated to recover indium as metallic indium of high purity.

Inasmuch as indium chloride ($InCl_3$) begins to volatilize when heated above 750° F. and rapidly fumes off at 850° F. and above, under ordinary atmospheric pressure conditions, it was found necessary, in order to prevent volatilization losses of indium during treatment of the melt with a molten chloride slag, to employ a slag which would fuse at temperatures below that at which indium chloride would be lost as fume. Attempts to use lead chloride alone as the slag forming constituent were unsatisfactory because temperatures around 950° F. were required to produce a workable slag for reacting with the melt. At this high temperature excessive loss of indium by volatilization resulted.

It was found, however, that if lead chloride was reacted with the molten lead metal in the presence of low melting salts, such as zinc chloride or a eutectic mixture of zinc chloride and sodium chloride, the melting temperature of the resulting slag could be kept sufficiently low so that the loss of indium by volatilization was practically negligible. The function of the chlorides employed in treating the indium-containing melt was fourfold, (1) to provide the chloridizing agent, (2) to lower the fusion temperature of the resulting slag, (3) to decrease the concentration of the indium chloride in the slag by dilution and (4) to cover and prevent the metal of the melt from coming directly into contact with air during the process which is conveniently carried out as an open kettle operation. As slag forming agents I have found zinc chloride and sodium chloride to be entirely satisfactory. Further, by employing a suitable mixture of these low melting slag forming substances I have found that the recovery of indium is enhanced during the subsequent treatment of the slag. This treatment involves leaching the indium chloride slag with dilute sulphuric acid and precipitation of the dissolved indium by means of zinc dust.

Removal of indium from the melt with lead chloride is an equilibrium reaction. When the reaction is carried out at temperatures below 775° F. in the presence of diluent slags, loss of indium by volatilization is avoided but the completeness of indium removal from the metal phase is a function of the concentration of lead chloride in the final slag. Equilibrium of the reaction between the two phases (metal and slag) is usually attained in a few minutes when the molten phases are intimately mixed together. I have observed as the result of tests that an equilibrium exists between a liquid slag containing about 13% In, 20% Zn, 17% Pb all as chlorides including some sodium chloride and a lead metal bath (zinc free) containing 0.25% indium at about 725° F. under ordinary atmospheric pressure conditions.

To lower the indium content of the metal phase below 0.25% a greater concentration of lead chloride in the slag is required. However, the addition of large amounts of lead chloride is objectionable due to the formation of greater quantities of lead sulphate residue during the subsequent step of leaching with a correspondingly greater retention of soluble indium chloride in this insoluble residue. Accordingly, I prefer to resort to a countercurrent system which permits me to restrict the addition of lead chloride as a slag forming constituent whereby a high grade (10 to 14% In) indium chloride slag is formed during the process. After skimming this high indium slag from the kettle, the treated metal left generally contains from 0.20 to 0.30% indium. The zinc content of the treated metal phase at this stage is substantially nil.

To remove this residual 0.20 to 0.30% indium, the metal is preferably reacted with additional quantities of lead chloride (or chlorine gas) in the presence of diluent slags, such as $ZnCl_2$, $MgCl_2$, KCl and NaCl eutectic mixtures to provide a fluid slag at temperatures less than 800° F.

This slag is much lower in indium than the initial high indium slag and accordingly the temperature employed may be somewhat higher than 775° F. as used in the first chloride treatment step. The low grade indium chloride slag produced in this instance is returned to the system, being added to the next batch of lead metal to be treated as shown on the drawing flow sheet.

The zinc and indium content of the metal which is treated with the returned slag determines whether additional lead chloride and/or zinc chloride are required in order to properly balance the reaction. If the original metal contains no zinc, metallic zinc may be added to react with the lead chloride in the return slag which is in excess of the amount necessary for indium removal, forming a part or all of the zinc chloride needed.

As an alternative method for removing the residual indium left in the metal phase after removal of the high-indium chloride slag, the metal may be treated with caustic and sodium nitrate. Inasmuch as zinc has been removed by the initial lead chloride treatment there is no interference by zinc. However, if the metal contains relatively large amounts of antimony, arsenic, tin or tellurium, as impurities this caustic-niter method is much less suited because of the lack of selectivity between indium and these impurities as previously explained. In this respect the chloride method possesses a marked advantage over the caustic-niter procedure described. Where the indium containing metal to be processed is sufficiently low or free from these impurities the latter method may, however, be used as indicated in dotted lines on the drawing flow sheet.

The procedure for practicing my invention is illustrated by the following specific examples:

Example I

Indium bearing lead in the amount of 50,330 lbs. and assaying 0.96% In, 0.95% Zn and 0.10% Sn but substantially free from other impurities, i. e. Cu, Bi, Sb, As, Te, Ag and Tl was placed in a kettle and melted. To this melt was added 3000 lbs. of lead chloride and 300 lbs. of sodium chloride, the chlorides being introduced onto the surface of the melt which was maintained at a temperature of between 710 and 720° F.

After mixing the fused chlorides into the melt for 20 minutes, the stirring was stopped and the chloride slag skimmed from the surface of the melt. The chloride slag weighed 2308 lbs. and assayed 13.7% indium, 20.1% zinc and 18.7% lead as principal constituents. The treated lead metal remaining after skimming off the indium chloride slag contained 0.30% indium but was free from zinc. To remove the residual indium the lead metal was heated to about 840° F. to form a melt and 1000 lbs. of NaOH and 100 lbs. of NaCl introduced into the melt after which the melt was stirred for approximately four hours while the temperature was held between 825°–850° F. Thereafter 90 lbs. of NaNO3 was stirred gradually into the melt and the mass was stirred for approximately 1 hour and a half. After this treatment the indium content of the metal had been lowered to 0.15%. The melt was then treated with 700 lbs. more of caustic (NaOH) and 50 lbs. of niter and after mixing for an additional 2 hours and 40 minutes the lead metal was found to contain no indium. Caustic slag skimmed from the melt weighed 2395 lbs. and assayed 6.43% indium. The treated lead metal remaining which was free from indium amounted to 50,800 lbs. was transferred to the lead refinery to remove small amounts of bismuth and doré.

To recover the indium from the chloride slag produced by treating the melt with chloride salts the slag weighing 2308 lbs. was placed in a leaching tank and leached with aqueous $H_2SO_4$ containing 397.0 lbs. sulphuric acid and 82.0 cu. ft. of water. After leaching with agitation at 158–167° C. the leached mass was cooled to 72° F. and filtered and the residue washed with water. The filtrate solution was controlled so as to contain approximately 45 gms./liter of $H_2SO_4$ and analyzed 50 gms./liter of indium. Inasmuch as the volume of the solution measured 98.0 cu. ft., the amount of indium in solution totaled about 303.6 lbs. To this filtrate solution was added 415 lbs. of zinc dust and the mixture agitated while the temperature was maintained at 150°–170° F. to precipitate the indium from the solution as a spongy mass.

After precipitation of the indium the solution was filtered and the filtrate being practically free of indium (0.02%) was discarded. Sponge indium retained on the filter cloth was pressed and then digested at 320° to 374° F. with caustic, using 175.0 lbs. NaOH and 46.0 lbs. water. Following digestion of the sponge indium with caustic solution the clear solution was decanted and the remainder passed to a filter press to recover the residue which was returned to the initial leaching tank for recycling. The caustic filtrate was found to contain no indium and was discarded.

Crude indium metal recovered after digesting with caustic solution weighed 310 lbs. and assayed 97.5% In, 0.5% Zn, approximately 1% Tl, approximately 0.5% Pb, 0.03% Sn, 0.01% Sb. To produce refined indium this crude indium metal was melted in an iron kettle to about 500° F. and chemically pure zinc chloride added in the amount of approximately 7% by weight of the metal treated and thereafter 15 lbs. of chlorine gas was reacted with the melt at temperature of 350°–390° F. Upon removing the slag indium metal of 99.55% purity was obtained which was substantially free of thallium and impurities which would interfere with electrolysis of the indium metal. Using this indium metal as anodes electrolysis was carried out producing a final indium metal analyzing 99.9+% pure indium. Preferably an acid sulphate electrolyte is used. A suitable electrolyte comprises an aqueous sulphuric acid solution containing about 10 gms./liter of sodium sulphate and having a pH value of between 1.8 and 2.2.

Example II

Indium bearing zincky lead in the amount of 100 lbs. and assaying 0.85% In, 0.90% Zn, Sn 1.5% and additional small amounts of Sb, As, Bi, Cu and Ag was melted in a kettle. To this melt was added 9.2 lbs. of indium chloride slag returned from previous charge for recycling containing In, Zn, Pb and Na chloride complexes. This slag was added to the surface of the melt and fused forming a cover slag which was gradually stirred into the melt without exposing the metal surface to air oxidation, the melt being held at a temperature between 725° and 750° F. during the treatment.

After mixing the melt and slag for approximately 45 minutes stirring was stopped and the slag skimmed from the melt. The slag produced weighed 7.7 lbs. and assayed 10.8% In, 29.1% Zn and 13% Pb as the principal constituents. This indium chloride slag was then treated to recover metallic indium as described in Example I.

The treated metal remaining after removal of the indium chloride slag and amounting to about 100 lbs. contained no zinc and only 0.20% indium. This metal has reheated to 735° F. and treated with a mixture comprising 6 lbs. of lead chloride, 3 lbs. zinc chloride and 0.5 lb. sodium chloride. After melting and intermixing this chloride slag with the melt for about 45 minutes without unduly exposing the metal surface to air oxidation and while maintaining the temperature of the melt to between 725° and 750° F. the mixing was stopped and the slag skimmed off. The skimmings weighed 9.2 lbs. and comprised a low grade indium slag which was returned for retreatment with next charge. The residual lead metal remaining after skimming off the slag weighed 101.5 lbs. and assayed 0.02% indium with minor quantities of other impurities. This lead metal which was substantially free of indium was transferred to the lead refinery.

In carrying out my process it will be observed that when sufficient amount of zinc is present the chloride may all be introduced as $PbCl_2$ and NaCl inasmuch as $ZnCl_2$ will be formed during the ensuing reaction. Likewise other sufficiently low melting slag forming salts, i. e. Zn, Pb and Na chlorides may be employed in practicing my process. For example, suitable mixtures of $MgCl_2$, KCl or NaCl and the like may be substituted for my preferred slag forming substances. All that is necessary is to use proper proportions of a chloride reagent and flux such that the resulting mixture will melt at a sufficiently low temperature and react with the indium in the melt forming indium chloride without incurring volatilization losses of indium which result when the melt is overheated as explained. It will be understood, of course, that where the chlorine supplying substance used has sufficiently low melting properties the addition of flux may be omitted.

As an alternative procedure for chloridizing the metal, the indium containing melt may be provided with a suitable cover slag and the indium reacted with chloride by introducing gaseous chlorine into the molten mass at the proper temperature whereby indium is united with chlorine to form indium chloride which enters the slag phase and is separated from the body of the melt as described.

The present process offers many important advantages over prior methods. It is economical to operate and requires no special equipment, the process being adapted to be carried out in an open kettle without fume collecting apparatus. Moreover, the invention provides a commercially practical and efficient method of treating metals containing indium to recover the indium as metal of high purity.

While I have described the invention by way of specific examples, it will be understood that various changes, substitutions and omissions may be made by those skilled in the art without departing from the spirit and scope of my invention as defined in the annexed claims.

What is claimed is:

1. A process for separating indium from indium-containing lead metal and lead alloys which comprises establishing a molten bath of the material to be treated, introducing slag forming ingredients including a chloridizing agent in the molten bath and stirring the slag into the melt to cause the indium to react with said chloridizing agent and form indium chloride, said slag being sufficiently low melting to produce a liquid cover slag for said molten bath at temperatures below that at which indium chloride volatilizes and escapes as fume, and separating the thus formed indium chloride from the surface of the melt as a slag constituent.

2. A process for separating indium from indium-containing lead metal and lead alloys which comprises heating said material to form a melt, introducing a low melting chloride flux and chlorine supplying reagent onto the surface of the melt and fusing said flux and reagent to produce a chloride slag for said melt, said slag being sufficiently low melting to produce a liquid slag at temperatures below that at which indium is lost by fuming, intermixing the chloride slag and melt without excessive exposure of the metal to air to cause the indium present in the melt to react with said chloride slag and form indium chloride, thereafter separating said indium chloride-containing slag and leaching same to selectively dissolve the indium chloride, and treating the leach solution containing indium chloride to precipitate the indium.

3. A process for separating indium from indium-containing lead metal and lead alloys which comprises establishing a molten bath of the material to be treated, introducing slag forming ingredients including a chloridizing agent in the molten bath to cause the indium to react therewith and form indium chloride, said slag being sufficiently low melting to produce a liquid cover slag for said molten bath at temperatures below that at which indium chloride volatilizes and escapes as fume, separating the thus formed indium chloride from the surface of the melt as a slag constituent, leaching the slag with dilute aqueous sulphuric acid, precipitating the indium from the leach solution with zinc dust, and treating the precipitated indium metal to remove the zinc as zinc chloride and produce indium metal which is substantially free of impurities.

4. A process for separating indium from indium-containing lead metal and lead alloys which comprises establishing a molten bath of the material to be treated, introducing slag forming ingredients including a chloridizing agent in the molten bath to cause the indium to react therewith and form indium chloride, said slag being sufficiently low melting to produce a liquid cover slag for said molten bath at temperatures below that at which indium chloride volatilizes and escapes as fume, separating the slag from the melt, leaching said slag with an aqueous sulphuric acid solution containing approximately 45 grams per liter of sulphuric acid to dissolve the indium chloride contained in said slag, said leaching being carried out by intermixing said slag and sulphuric acid solution heated to between 170° and 185° F., thereafter cooling the mixture to about 70° F. and filtering the solution from the residue, heating the filtrate to between 150° and 160° F. and precipitating indium from said solution by the addition of zinc dust with stirring, digesting the indium thus precipitated with caustic soda solution while the solution is heated at between 300° and 375° F., filtering and washing the residue to remove caustic and returning the residue to the sulphuric acid leaching step, recovering crude indium metal after treatment with caustic solution and treating the same to remove thallium by establishing a melt of said crude metal, introducing chemically pure zinc chloride and chlorine gas into said melt to react with the thallium and form thallium chloride and a zinc chloride slag mixture, separating said zinc chloride and thallium chloride containing slag from the melt to recover a relatively pure indium metal.

5. In the process of recovering indium from indium-bearing metal material containing lead and zinc the steps which comprise establishing a melt of said material, adding a lead chloride-flux mixture thereto, said chloride and flux being introduced in proportionate amounts such that the resulting mixture will melt and form a cover slag for the melt at a temperature below that at which substantial loss of indium by volatilization from said melt occurs, reacting said mixture with the melt to convert the indium into indium chloride, and separating the slag which includes the indium chloride from the melt.

6. In the process of recovering indium from zincky indium-bearing lead metal the steps which comprise establishing a melt of the indium-bearing metal, introducing a chloridizing mixture comprising lead chloride and sodium chloride, said chloride constituents being introduced in proportionate amounts such that the resulting mixture will melt and form a cover slag for said melt at temperatures sufficiently below that at which indium is lost by volatilization, and intermixing the chloride slag and melt to react the chloride with the indium and convert the indium of the melt into indium chloride.

7. The process of recovering indium from indium-bearing lead metal which comprises establishing a melt of the indium-bearing metal, introducing a mixture of lead chloride, zinc chloride and sodium chloride into said melt to form a low melting chloridizing slag for said melt, said chloride constituents being introduced in proportionate amounts such that the resulting mixture will melt and form a cover slag for said melt at temperatures below that at which indium begins to fume off from the melt, reacting said chloridizing slag with the melt by stirring the same together while the melt is heated to a temperature between about 700° and 750° F., separating the resultant chloride slag from the melt and recovering the indium chloride from the chloride slag by dissolving the indium chloride in sulphuric acid solution and filtering the solution to remove the insoluble residue.

8. In the recovery of indium from indium-bearing lead containing appreciable amounts of Zn, As, Sb, and Te as impurities, the steps which consist in establishing a melt of such indium-bearing lead, intermixing therewith a chloridizing slag, said slag comprising chlorine as the chloridizing agent and melting below about 750° F., reacting said chloridizing slag with the melt to convert substantially all the indium into indium chloride, separating the slag containing indium chloride from the melt, recovering the indium chloride from the said slag by selectively dissolving said indium chloride in acid solution, precipitating the indium from solution by adding zinc, and chloridizing the zinc and separating it as a slag to produce a relatively pure indium metal.

9. The process of recovering indium from indium-bearing lead metal material containing zinc and thallium as impurities which comprises establishing a melt of the indium bearing material, adding a mixture of lead chloride and flux, said lead chloride-flux mixture forming a low melting slag on top of said melt, reacting this chloridizing slag with the melt by intermixing the same to convert substantially all the indium present in the melt into indium chloride, removing the indium chloride containing slag from the melt by acid leaching said indium chloride slag, precipitating the indium as a spongy indium precipitate, digesting said spongy metal with caustic to produce crude indium metal, separating the crude indium metal from the caustic liquor, melting said crude indium metal and reacting it with zinc chloride and chlorine gas to convert the zinc and thallium present to chlorides, separating the chloride slag formed including the zinc and thallium chlorides and recovering indium metal substantially free from thallium and zinc impurities.

10. In a process for separating indium from impure lead metal containing indium, the steps which comprise establishing a melt of said lead metal, providing a slag cover for said melt made up principally of metal chlorides, said slag being molten at a temperature below that at which substantial losses of indium are incurred by volatilization, introducing a chloridizing agent and intermixing said slag, chloridizing agent and melt to cause the same to react converting the indium constituent of the melt to indium chloride which enters the slag, and thereafter separating the slag containing indium chloride from the melt, said chloridizing treatment being carried out at a temperature which avoids loss of indium by volatilization.

11. In a process for separating indium from impure lead metal containing indium, the steps which comprise establishing a melt of said lead metal, providing a cover slag for said melt which is made up principally of a mixture of lead chloride and zinc chloride, the slag melting below the temperature at which substantial losses of indium by volatilization occurs, intermixing the molten slag and melt to convert the indium constituent of the melt to indium chloride which enters in the cover slag, said chloridizing treatment being carried out at a temperature which avoids loss of indium by volatilization, separating the slag containing indium chloride from the melt, selectively dissolving the indium chloride out of said slag in an acid solution, and filtering the solution to remove insoluble residue and recover a filtrate containing indium in solution.

YURII E. LEBEDEFF.

REFERENCES CITED

The following references are of record in the file of this patent:

UNITED STATES PATENTS

| Number | Name | Date |
|---|---|---|
| 707,551 | Clamer | Aug. 29, 1902 |
| 1,855,455 | McCutcheon | Apr. 26, 1932 |
| 1,912,590 | Murray | June 6, 1933 |
| 2,082,487 | Frick | June 1, 1937 |
| 2,113,643 | Betterton et al. | Apr. 12, 1938 |
| 2,119,197 | Betterton et al. | May 31, 1938 |
| 2,378,848 | Heberlin | June 19, 1945 |
| 2,384,610 | Doran et al. | Sept. 11, 1945 |

OTHER REFERENCES

Transactions of American Electrochemical Society, vol. 65 (1934), pages 380 and 383.

Chapters in the Chemistry of the Less Familiar Elements, by Hopkins, vol. I, 1939, pages 13 and 14 of chapter 8.

Principles and Applications of Electrochemistry, by W. A. Koehler, vol. II (2nd edition), 1944, page 159.